United States Patent
Sullivan

(10) Patent No.: US 7,523,607 B2
(45) Date of Patent: Apr. 28, 2009

(54) SYSTEM AND METHOD FOR REDUCING VEHICLE EMISSIONS AND/OR GENERATING HYDROGEN

(76) Inventor: John Timothy Sullivan, 11339 Barley Field Way, Marriottsville, MD (US) 21104-1346

(*) Notice: Subject to any disclaimer, the term of this patent is extended or adjusted under 35 U.S.C. 154(b) by 0 days.

(21) Appl. No.: 11/056,237

(22) Filed: Feb. 14, 2005

(65) Prior Publication Data
US 2006/0179820 A1   Aug. 17, 2006

(51) Int. Cl.
*F01N 3/02* (2006.01)
(52) U.S. Cl. .......................... 60/320; 60/298
(58) Field of Classification Search ............... 60/298, 60/299, 320; 422/109, 110, 173
See application file for complete search history.

(56) References Cited

U.S. PATENT DOCUMENTS

| | | | |
|---|---|---|---|
| 3,217,696 A | 11/1965 | Kiekhaefer | |
| 4,161,657 A | 7/1979 | Shaffer, Jr. ................... | 290/1 |
| 4,256,060 A | 3/1981 | Kelly ............................. | 123/3 |
| 4,368,696 A | 1/1983 | Reinhardt ..................... | 123/3 |
| 4,520,305 A * | 5/1985 | Cauchy ........................ | 322/2 R |
| 4,673,863 A | 6/1987 | Swarbrick | |
| 4,753,682 A | 6/1988 | Cantoni | |
| 4,911,894 A * | 3/1990 | Retallick et al. ............. | 422/174 |
| 5,033,264 A * | 7/1991 | Cabral .......................... | 60/274 |
| 5,105,773 A | 4/1992 | Cunningham et al. ....... | 123/3 |
| 5,343,699 A | 9/1994 | McAlister .................... | 60/273 |
| 5,436,216 A * | 7/1995 | Toyao et al. ................. | 502/439 |
| 5,450,822 A | 9/1995 | Cunningham ................ | 123/3 |
| 5,477,676 A * | 12/1995 | Benson et al. ................ | 60/274 |
| 5,540,831 A | 7/1996 | Klein ........................... | 205/630 |
| 5,625,245 A | 4/1997 | Bass ............................. | 310/306 |
| 5,753,383 A | 5/1998 | Cargnelli et al. ............. | 429/13 |
| 5,852,274 A | 12/1998 | Watanabe et al. | |
| 5,948,504 A | 9/1999 | Swars et al. | |
| 5,968,456 A | 10/1999 | Parise .......................... | 422/174 |
| 6,162,403 A | 12/2000 | Foster et al. | |
| 6,168,763 B1 | 1/2001 | Hotz et al. | |
| 6,172,427 B1 | 1/2001 | Shinohara et al. | |
| 6,231,831 B1 | 5/2001 | Autenrieth et al. | |
| 6,282,371 B1 * | 8/2001 | Martin et al. ................ | 392/490 |
| 6,605,773 B2 | 8/2002 | Kok et al. | |
| 6,461,752 B1 | 10/2002 | Leung ........................... | 429/20 |
| 6,516,615 B1 | 2/2003 | Stockhausen et al. ........ | 60/597 |
| 6,559,551 B2 | 5/2003 | Graage et al. ................. | 290/40 |

(Continued)

*Primary Examiner*—Thomas E Denion
*Assistant Examiner*—Diem Tran
(74) *Attorney, Agent, or Firm*—Bacon & Thomas, PLLC

(57) ABSTRACT

Emissions from systems that use a catalytic converter are substantially reduced by introducing hydrogen, or a hydrogen containing fluid or fuel component, into the exhaust stream being scrubbed by the catalytic converter, resulting in instant lightoff and a significant reduction in emissions. Hydrogen for injection into the exhaust stream may, optionally, be generated within the vehicle using heat recovered from the catalytic converter, and/or the engine or elsewhere in the exhaust system, by a thermoelectric generator, the electrical output of which may be used to perform electrolysis and/or to power a reformer in order to generate the hydrogen. The thermoelectric generator may be retrofit onto the catalytic converter, or integrated in a way that enhances thermoelectric generation, including providing a catalyst coated heat sink and integrated cooling pipes to enhance the thermal differential required for thermoelectric generation. Sensors such as an oxygen sensor and temperature sensor may be provided to assess converter performance and adjust the temperature differential to ensure that the temperature of the converter remains optimum.

12 Claims, 5 Drawing Sheets

U.S. PATENT DOCUMENTS

| | | |
|---|---|---|
| 6,562,305 B1 | 5/2003 | Swars et al. |
| 6,571,552 B2 * | 6/2003 | Ban et al. .................. 60/312 |
| 6,613,293 B2 | 9/2003 | Dornseiffer et al. |
| 6,659,049 B2 | 12/2003 | Zagaja et al. ............... 123/3 |
| 6,804,965 B2 * | 10/2004 | Abras ......................... 62/3.7 |
| 6,821,491 B1 | 11/2004 | Brueck et al. |
| 6,827,909 B1 | 12/2004 | Brueck et al. |
| 6,986,247 B1 * | 1/2006 | Parise ......................... 60/284 |
| 2003/0085135 A1 | 5/2003 | Andrews et al. ............ 205/637 |

* cited by examiner

SYSTEM AND METHOD FOR REDUCING VEHICLE EMISSIONS AND/OR GENERATING HYDROGEN

BACKGROUND OF THE INVENTION

1. Field of the Invention

This invention relates to a system for reducing vehicle emissions in a vehicle having an internal combustion engine and a catalytic converter, and in particular to a system and method for rapidly bringing the catalytic converter to light-off temperature by introducing a hydrogen containing fluid into the exhaust stream.

The invention also relates to a system for reducing vehicle emissions by introducing a hydrogen containing fluid into the exhaust stream, and in which the hydrogen containing fluid is in the form of hydrogen gas generated by an on-board electrolysis device or reformer powered by the heat of the exhaust stream, for example by a thermo-electric generator secured to or integral with the catalytic converter. The hydrogen gas may also be added to the fuel intake to boost fuel efficiency and further reduce emissions.

The invention further relates to a system for utilizing waste heat generated by an internal combustion engine to generate hydrogen for use by the internal combustion engine or to reduce emissions.

Finally, the invention relates to a method for reducing emissions and conserving energy, and to a catalytic converter capable of reducing emissions and at the same time improving fuel efficiency.

2. Description of Related Art

In a conventional vehicle, 70% to 80% of emissions occur during the first 100 seconds following a cold-start. The reason is that the catalytic converter does not begin operating to reduce emissions until the catalyst has reached a "light-off" temperature. As a result, it has previously been proposed to pre-heat the catalytic converter, so that when the engine is started, the catalytic converter immediately begins reducing emissions. These proposals all involve electrically heating the converter using a resistance element, as described by way of example in U.S. Pat. Nos. 6,613,293; 6,562,305; 6,168,763; 5,948,504; and 5,852,274. Such heaters have the advantage of decreasing emissions not only during a cold start, but also during idling in the case of cooler running engines such as diesels. However, they have the disadvantage of increasing the electrical load on the engine, resulting in decreased fuel economy.

A partial solution to the problem of heating a catalytic converter without decreased fuel economy is proposed in U.S. Pat. No. 5,968,456. According to U.S. Pat. No. 5,968,456, the device that pre-heat the converter is a thermo-electric generator that generates electricity from the heat carried by the exhaust stream when pre-heating is not required. As a result, there is a net energy savings since the electricity generated by the thermo-electric generator can be stored in a battery and used not only to power the heater, but also electrical systems and devices.

Other proposals for converting waste heat emitted by an internal combustion engine or carried by the exhaust stream or engine coolant are found in U.S. Pat. Nos. 6,605,773; 6,172,427; 5,625,245; 4,753,682; and 4,673,863, while U.S. Pat. Nos. 5,753,383 and 4,161,657 propose the inclusion of thermoelectric generators in hydrogen powered vehicles that includes both a burner module and a fuel cell. For the most part, these systems promise significant energy savings (for example, around 80% of the energy output of an internal combustion engine is in the form of heat). However, use of the energy to pre-heat a catalytic converter at start-up, as proposed in the above-discussed U.S. Pat. No. 5,968,456, is not the best use for the re-captured energy, and in fact negates a significant portion of the energy savings since (i) resistance heating is not very energy efficient, and (ii) the added electrical load on the engine at start-up requires a much higher system energy capacity, including higher capacity batteries. The need for higher capacity batteries increases the weight of the vehicle and decreases fuel efficiency.

None of the previous proposals for using electric resistance elements, and/or a thermo-electric generator, to pre-heat a catalytic converter involves injecting a hydrogen-containing gas into the converter in order to initiate an exothermic reaction that instantaneously heats the catalyst. It is of course known that hydrogen can cause heating of a catalyst (see, e.g., U.S. Pat. No. 6,231,831, which discloses a heating of a catalyst-coated membrane in a methanol reformation system), but the principle has not previously been applied to the catalytic converter of a vehicle emissions reduction system.

Additional background on the generation and use of hydrogen in vehicles is found in U.S. Pat. No. 6,659,049 (condensation in exhaust converted to hydrogen for mixture with hydrocarbon fuel); U.S. Pat. No. 6,559,551 (hydrogen generation for a fuel cell); U.S. Pat. No. 4,368,696 (hydrogen and oxygen generation to supplement gasoline fuel); and U.S. Pat. No. 6,516,615 (compressed hydrogen fuel that obtains work from both decompression and burning).

SUMMARY OF THE INVENTION

It is accordingly a first objective of the invention to provide a system and method for reducing emissions from an internal combustion engine without increasing fuel consumption.

It is a second objective of the invention to provide a system and method for reducing emissions from an internal combustion engine that is simple, reliable, and economical to operate.

It is a third objective of the invention to provide a catalytic converter having reduced emissions.

It is a fourth objective of the invention to provide a catalytic converter that contributes to more efficient energy utilization.

It is a fifth objective of the invention to provide a system and method of pre-heating a catalytic converter that does not significantly increase the electrical load on the vehicle at start-up.

It is a sixth objective of the invention to provide an internal combustion/hydrogen powered hybrid vehicle having enhanced efficiency and lower emissions.

It is a seventh objective of the invention to provide a method and system that utilizes waste heat generated during operation of an internal combustion engine to reduce emissions.

These objectives are achieved, in accordance with the principles of a preferred embodiment of the invention, by providing a system and method in which a hydrogen-containing fluid, such as pure hydrogen, methanol, or propane, is injected into the exhaust stream to cause a reaction that instantly heats the catalyst layer of a catalytic converter.

According to a preferred embodiment of the invention, the fluid injected into the exhaust stream is hydrogen gas generated within the vehicle using heat recovered from the catalytic converter, the engine block or engine cooling system, and/or elsewhere in the exhaust system, by a thermo-electric generator. The electrical output of the thermoelectric generator is preferably used to perform electrolysis and/or to power a reformer in order to generate the hydrogen. The hydrogen may be stored in a tank or in solid form (i.e., in a brick), and may be added to the engine fuel intake to improve burning efficiency. The addition of hydrogen to the fuel intake may be constant or only during acceleration.

In order to increase the efficiency of hydrogen generation within the vehicle by electrolysis, and to prevent freezing, an aqueous solution of at least 30% methanol may be used, rather than pure water. Alternatively, filtered and de-ionized diesel fuel or other hydrocarbons may be supplied directly to the electrolysis generator. Use of filtered and de-ionized diesel fuel would be especially convenient in a vehicle in which the primary internal combustion engine is a diesel engine.

According to another feature of the preferred embodiment, the hydrogen generator may be equipped with sensors to measure power consumption and water level. The sensors may be connected to a wireless transmitter that conveys data gathered by the sensors to a central station in order to log the hydrogen produced in order, for example, to take advantage of energy tax credits offered by the U.S. government and/or to signal the need for maintenance.

Alternative to generating the hydrogen within the vehicle, the hydrogen may be externally generated and pumped into a small storage tank or supplied in brick form. In that case, energy from waste heat may be used for other purposes, such as heating of fuel injectors to get better atomization and gas mileage (the use of energy generated from waste heat for this purpose results in a true increase in gas mileage, whereas using the conventional vehicle's electrical system would not result in a net savings), or the various purposes described in the above-cited U.S. Pat. Nos. 6,605,773; 6,172,427; 5,625,245; 4,753,682; and 4,673,863.

The invention also provides an integrated catalytic converter designed to enhance thermoelectric generation, including providing a catalyst coated heat sink and integrated cooling pipes to enhance the thermal differential required for thermoelectric generation. In an especially preferred embodiment of the invention, sensors such as an oxygen sensor and temperature sensor may be provided to assess converter performance and adjust the temperature differential to ensure that the temperature of the converter remains optimum. If the temperature is too hot, the life of the catalyst will be reduced, and therefore the catalyst should remain at about the light-off temperature.

The heat sink of the preferred catalytic converter may, for example, consist of a metal foil coated on both sides with a catalyst and arranged in a spiral "jelly roll" configuration such that heat may be conducted by the metal foil all the way from the interior of the spiral to the outside. In addition, louvers or similar structures may extend from the foil to provide spacing, equalize pressure, trap soot, create turbulence in the exhaust stream, and/or direct exhaust gases.

The spiral heat sink arrangement maximizes the area of catalyst exposed to the exhaust while at the same time providing a optimal transfer of heat to the outside. Instead of insulating the outside surface of the catalyst-coated foil, the foil is preferably positioned within a heat transfer structure for transferring heat from the heat sink to a heat dissipating or cooling structure, and thermoelectric generator units connected across the thermal differential between the heat transfer structure and the heat dissipating or cooling structure. The heat transfer structure may be a modular arrangement that clamps onto the outside of the converter core.

The principles of the invention may be applied to any vehicle having an internal combustion engine, including diesel and gasoline power vehicles, and gas/electric hybrid vehicles. In addition, the principle of instant lightoff through the addition of hydrogen, or a hydrogen containing gas, to the exhaust stream, may be applied to any catalytic converter including conventional ceramic honeycomb converters and more efficient sheet metal converters such as the one disclosed in U.S. Pat. No. 6,827,909.

DETAILED DESCRIPTION OF THE PREFERRED EMBODIMENTS

Figure 1:
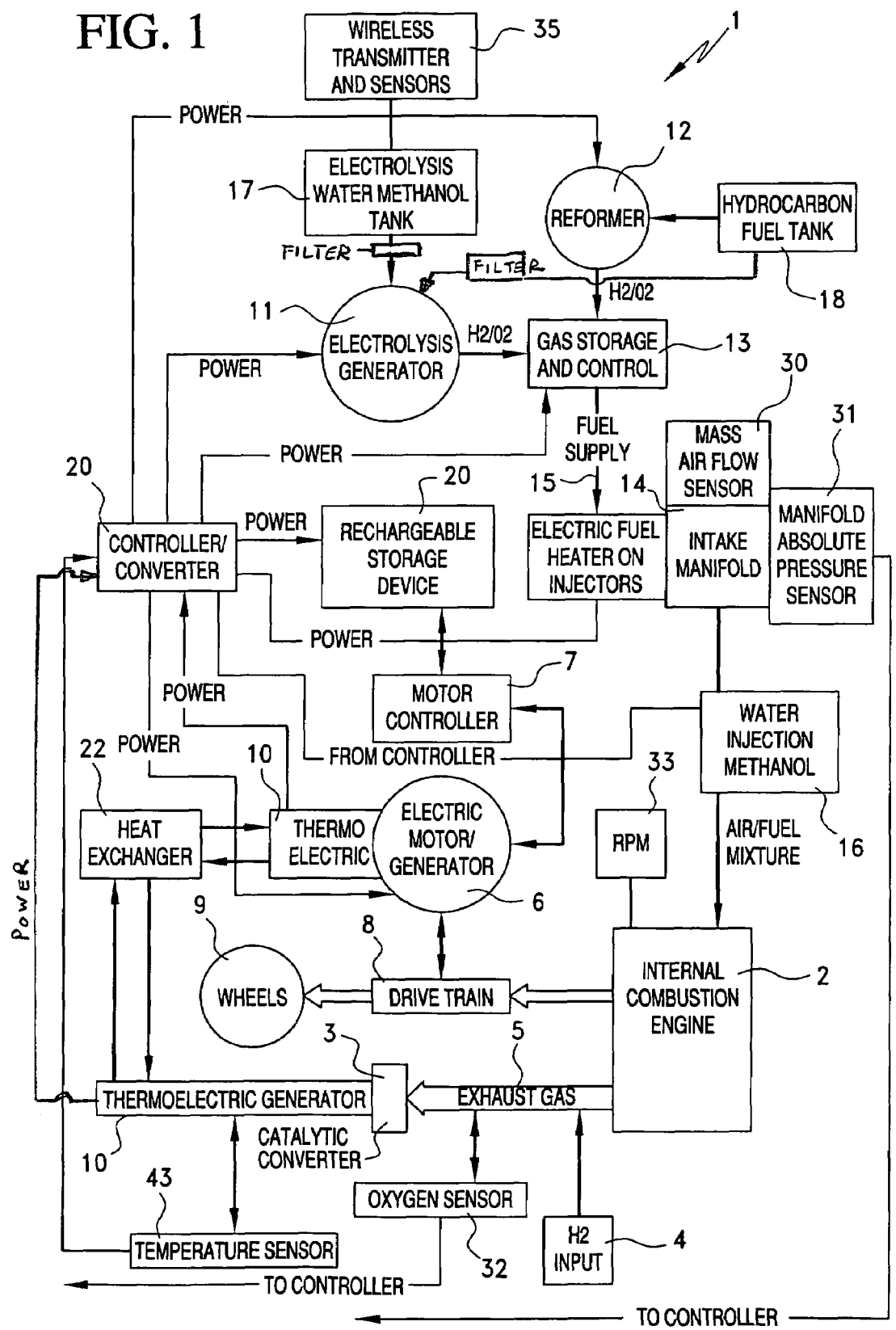
FIG. 1 is a block diagram of a thermoelectric-hydrogen hybrid power system constructed in accordance with the principles of a preferred embodiment of the invention.

FIG. 1 shows a thermoelectric-hydrogen hybrid power system 1 that illustrates the principles of a preferred embodiment of the invention. Power system 1 includes an internal combustion engine 2 that generates an exhaust stream, and a catalytic converter 3 for reducing the amount of hydrocarbon pollutants in the exhaust stream by interaction with a catalyst. While power system 1 is especially suitable for vehicles having a drive train 8 and wheels 9, the invention may also be applied to other types of vehicles in which the exhaust stream might be directed through a catalytic converter, such as trains and watercraft, and it is also within the scope of the invention to apply the principles of the invention to a stationary generator system, or any other system that utilizes an internal combustion engine.

According to the principles of the invention, in order to reduce cold-start emissions by pre-heating the catalytic converter 3, power system 1 includes means, in the form of an injection device or intake valve 4, for introducing a hydrogen-containing fluid or fuel component into the exhaust stream 5 when the engine is started and the exhaust stream is first generated. Injection device 4 connected to the exhaust system at a point upstream of the catalytic converter 3, and is further connected to a source of hydrogen-containing fluid, which may be in the form of a gas storage tank 13 as described below, and to a system controller 20, so as to inject the fluid into the exhaust stream at start-up in order to minimize lightoff time while stopping the injection after light-off has occurred and is sustainable by the heat of the exhaust gases. It is possible that additional fluid may need to be injected into the fuel stream during idling, particularly in the case of diesel and other cool-running engines.

FIG. 1 illustrates a system in which the fluid injected into the exhaust stream is pure or substantially pure hydrogen gas. However, other hydrogen-containing fluids, such as propane, should have the same effect on the catalytic converter, and therefore it is also within the scope of the invention to inject propane or another gas, so long as the effect of the gas intake to the exhaust stream is to cause instantaneous lightoff of the catalyst, enabling the catalytic converter to begin reducing emissions immediately. In addition, oxygen generated as a by-product of hydrogen generation may be supplied separately to the converter input.

Engine 2 may be any internal combustion engine that produces an exhaust stream 5, including both gasoline and diesel engines, or engines associated with a hybrid gas/electric power system. The illustrated power system 1 is a "hybrid" power system that includes not only an internal combustion engine 2, but also an electric motor 6 controlled by a motor controller 7 to supply the primary motive force during low torque operation, which is assisted by the internal combustion engine during acceleration and when moving large loads, and which generates electricity during braking and under certain conditions when the internal combustion engine is operating. Such "hybrid" gas/electric power systems are well known and used in a variety of commercially available vehicles as a way of reducing both emissions and fuel consumption, primarily as a result of the energy recaptured during regenerative braking, which replaces energy that would otherwise be obtained by burning fuel. On the other hand, however, the benefits of the present invention are equally applicable to power systems that lack an electric motor/generator corresponding to motor 6.

The catalytic converter 3 may be a conventional ceramic catalytic converter, one that uses metal sheets or foil, or even an electrically heated catalytic converter. Examples of catalytic converters to which the principles of the invention may be applied include, in addition to the converters disclosed in the above-discussed patents, the converters disclosed in U.S. Pat. Nos. 6,821,491 and 6,162,403, and the converters and pre-converters described in the articles "*New Diesel Catalyst System To Achieve European* 2005 *Legislation*" by Dipl.-Ing Frida Diefke et al. (2005) and "*Configurations—Automotive Preconvertersfor LEV/ULEV*," a brochure by Microlith™ (2005). Further, it is intended that the term "catalytic converter" encompass any device containing a catalyst (such as, but not limited to, platinum) that causes breakdown of emission constituents, and in which lightoff or activation of the catalyst is expedited by introducing hydrogen gas or another hydrogen-containing fluid into the exhaust stream.

According to a preferred embodiment of the invention, the hydrogen for injection into the exhaust stream 5 is generated within the power system using heat recovered from the catalytic converter 3, and/or the engine 2, motor 6, and/or elsewhere in the exhaust system, by a thermoelectric generator or generators 10. Thermoelectric generators are described in the above-cited U.S. Pat. Nos. 6,605,773; 6,172,427; 5,625,245; 4,753,682; and 4,673,863, and it is intended that the present invention not be limited to a particular type of thermoelectric generator. Current thermoelectric generator configurations are capable of generating upwards of 250 W when connected to a typical vehicle exhaust system.

According to the preferred embodiment of the invention, the electrical output of thermoelectric generator(s) 10 may be used either to perform electrolysis by means of an electrolysis generator 11, and/or to power a reformer 12. The resulting hydrogen, as well as oxygen generated during the electrolysis or reformation processes, is preferably stored in a storage device 13 that may take the form of a tank or solid storage (i.e., in a brick). If stored as a brick, then a source of heat will need to be included in order to extract the hydrogen. As indicated above, the storage device is connected to the injector or intake 4 for supplying hydrogen to the exhaust stream.

When not be supplied directly to a hydrogen generating device, the output of the thermoelectric generator may be stored in a battery 19 or other storage device, supplied directly to the electrolysis generator, the motor, or other electrical systems or devices, under controller of a master controller or power converter 20. For example, the electricity generated by the thermoelectric generator includes heating of fuel injectors by means of a heater 21 to get better atomization and gas mileage. Those skilled in the art will appreciate that the use of energy generated from waste heat for the purpose of fuel injector heating results in a true increase in gas mileage, whereas using the conventional vehicle's electrical system would not result in a net savings.

In addition to being connected to the injector 4, the hydrogen storage tank 13 may be connected to the intake manifold 14 and hydrogen stored in the tank added to the engine fuel supply 15 to improve burning efficiency. The addition of hydrogen to the fuel intake may be constant or only during an increased load such as occurs during acceleration. In addition, oxygen generated as a by-product of hydrogen generation may be stored and added to the engine fuel supply 15, while water and/or methanol may be added to the to the engine air/fuel mixture 28 via an intake 16 to prevent premature combustion or knocking, particularly when hydrogen and/or oxygen is also added.

Those skilled in the art will appreciate that, in the illustrated power system 1, the engine air/fuel mixture, including the addition of hydrogen, hydrogen and oxygen, and/or additional fuel components such as methanol or water as discussed above, may be controlled in a known manner by controller 20 in response to appropriate sensors such as a mass air flow sensor 30, manifold absolute pressure sensor 31, exhaust oxygen sensor 32, and tachometer 33.

Water for electrolysis or hydrocarbon fuel for reformation may be stored in tanks 17, 18 connected, respectively, to electrolysis generator 11 and/or reformer 12. Alternatively, in order to increase the efficiency of hydrogen generation within the vehicle by electrolysis, an aqueous solution of at least 30% methanol may be substituted for pure water, or filtered and de-ionized diesel fuel or other hydrocarbons may be supplied directly to the electrolysis generator. Those skilled in the art will appreciate that numerous techniques for generating hydrogen are currently being developed, and that the invention is not limited to any particular technique.

Finally, as illustrated in FIG. 1, sensors 35 may be added to the hydrogen generator 11 or 12, water tank 17, and/or fuel supply system, in order to measure the amount of hydrogen produced. The sensors 35 may be connected to or include a wireless transmitter arranged to transmit the measured amount to a central station in order to log or keep track of hydrogen production or power consumption.

Figure 2:
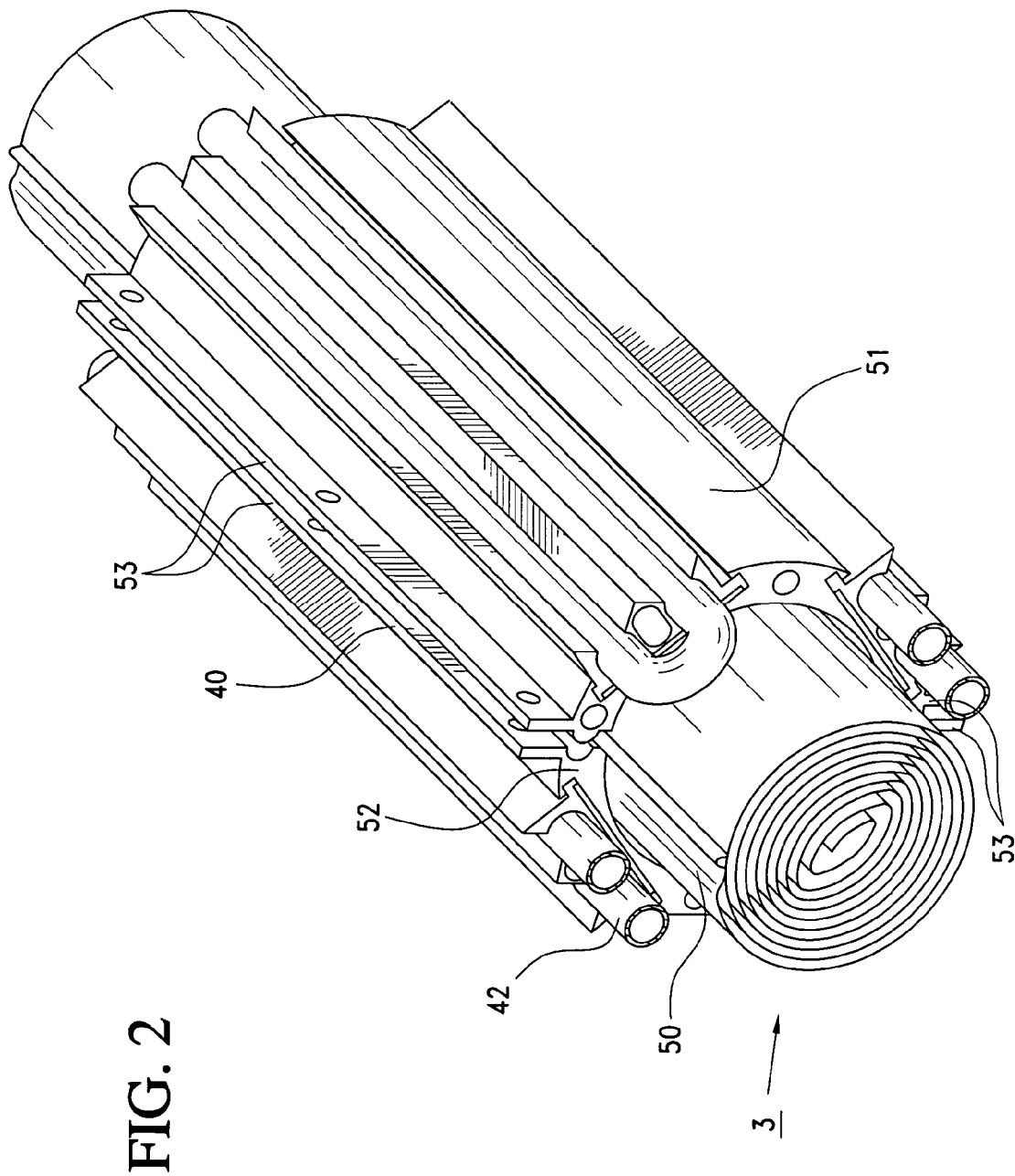
FIG. 2 is an isometric view of a catalytic converter assembly with integral thermoelectric generator for use in connection with the thermoelectric hydrogen hybrid vehicle illustrated in FIG. 1.
Figure 3:
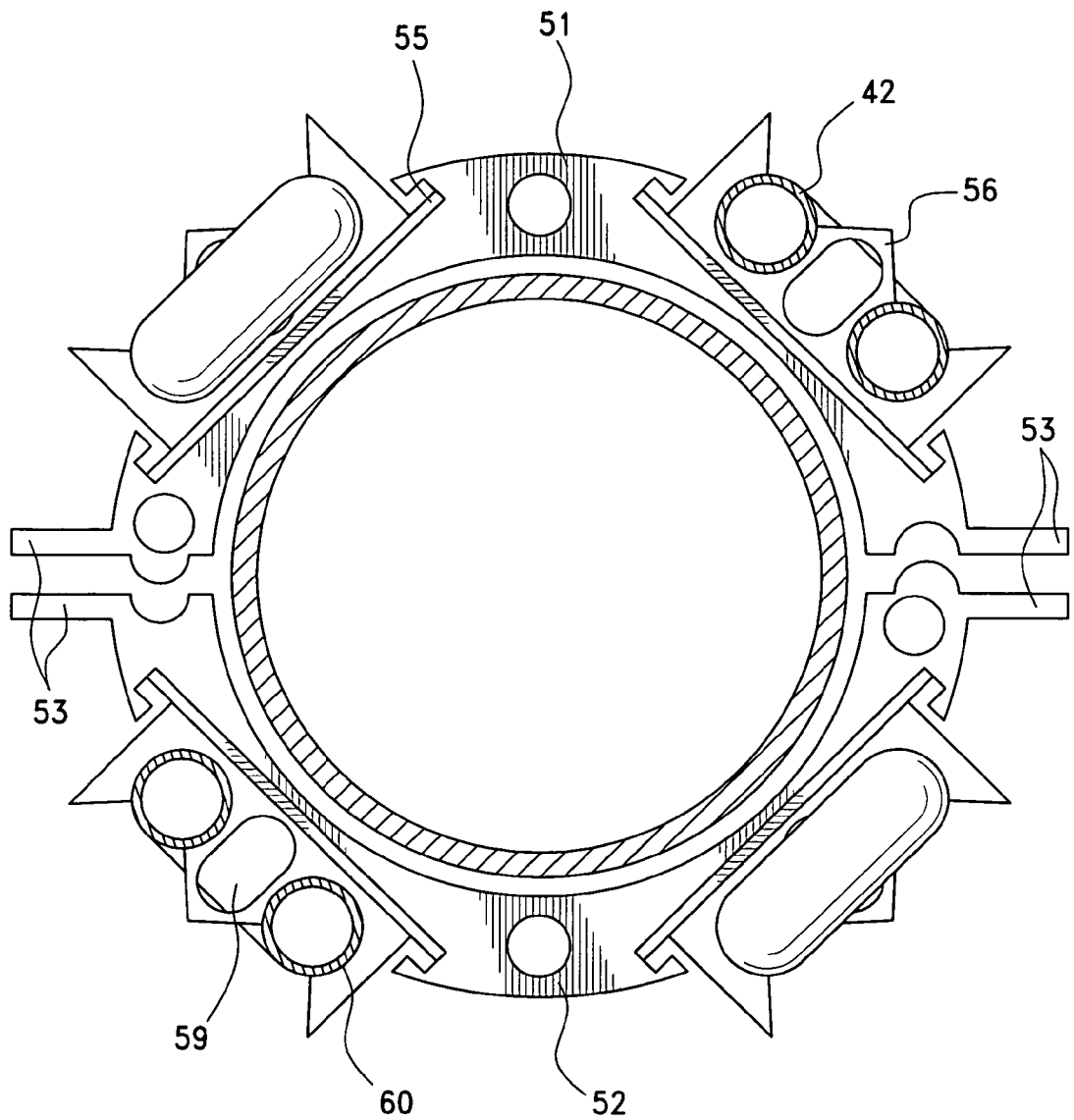
FIG. 3 is a cross-sectional view of the catalytic converter assembly of FIG. 2.

FIGS. 2 and 3 show an integrated catalytic converter assembly designed to enhance thermoelectric generation, including catalytic converter 3 and a heat exchanger 40 with integrated cooling pipes 42 to enhance the thermal differential required for thermoelectric generation. As will be explained in more detail below, the converter 3 includes a heat sink 50 arranged to transfer heat to the outside surface of the converter, where it is transferred to the heat exchanger 40. In the embodiment illustrated in FIGS. 2 and 3, heat exchanger 40 takes the form of two semi-cylindrical halves 51,52 arranged to be clamped or secured onto the outside of converter 3, for example, by fastening together the halves at flanges 53.

To facilitate servicing and assembly, exchanger halves 51,52 are arranged to support modular thermo-electric generator/cooling structures 54 each consisting of an insulated thermo-electric generator plate 55 containing a thermo-electric element, and cooling pipe mount 56. Plates 55 are secured in grooves 57 by appropriate brackets or fasteners 58. Each cooling pipe mount includes an air channel 59 and grooves 60 having a surface that extends over an arc of greater than 180° and less than 360° to enable pipes 42 to be removably snapped into place. Pipes 42 are connected to a coolant source so that a thermal differential exists between the heat exchanger halves 51,52 and the cooling pipe mounts 56.

Figure 4:
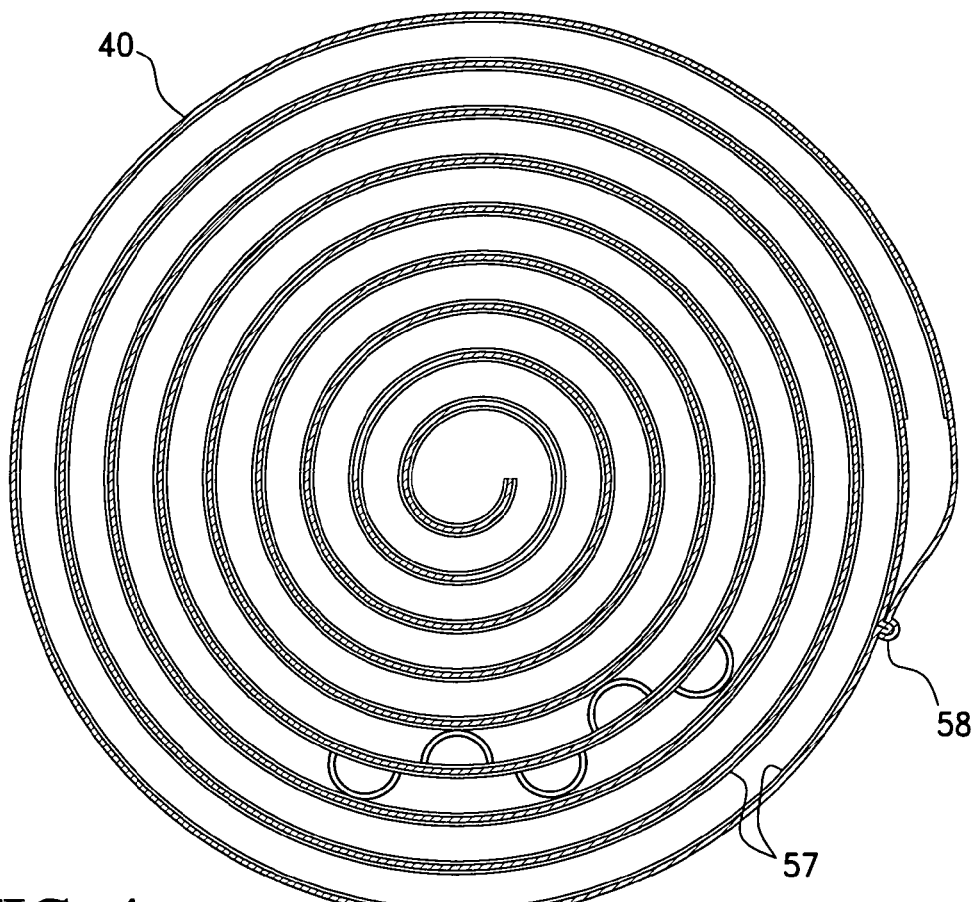
FIG. 4 is a cross-sectional view of a catalytic converter core for use in the assembly of FIG. 2.

As illustrated in FIG. 4, the converter 3 consists of a core made up of a heat sink 50 in the form of a foil or sheet coated on both sides with a catalyst layer 57 and rolled into a spiral or "jelly roll" configuration to maximize the surface area of catalyst exposed to the exhaust gases, which flow through the core in a direction perpendicular to the illustrated cross-section. The outside surface of the heat sink 50 is kept free of catalyst, with the edge 58 being welded, crimped, or otherwise secured to the outside surface so as to form a closed, sealed, structure in order to contain the exhaust gases. The catalyst is typically platinum but the invention is not limited to a particular catalyst.

Those skilled in the art will appreciate that the illustrated spiral or jelly roll configuration is illustrative in nature only. Any heat sink structure, configuration, or geometry that transfers heat to the outside of the converter for transfer to the heat exchanger 40 may be used, such as radial catalyst-coated heat sink fins, although the spiral configuration may have the advantage of creating vortices which increase the reaction efficiency or rate. For use in connection with a thermo-electric generator, it is only necessary that the outside surface of the converter be un-insulated.

Figure 5:
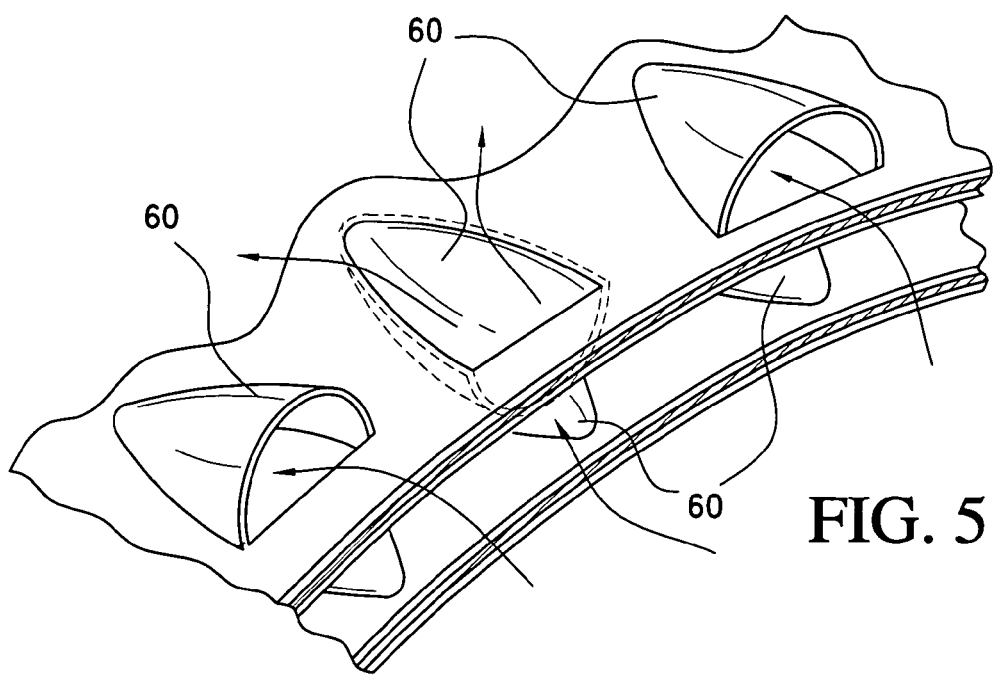
FIG. 5 is an isometric view of a louver structure included in the catalytic converter core of FIG. 4.

FIG. 5 shows a modification of the heat sink illustrated in FIG. 4, in which the foil or sheet 50 is provided with louvers 60 for spacing adjacent turns of sheet 50 in order to provide a passage for the exhaust stream. Louvers 60 may be used for a number of additional purposes, depending on their specific configuration, including pressure equalization (e.g., by varying the numbers of louvers with distance from the center), creation of turbulence in the exhaust stream, and/or direction of exhaust gases, and also to trap soot particles in the exhaust stream, thereby facilitate burning of the particles. It will be noted that FIG. 4 is not necessarily drawn to scale, and that the orientation and structure of the louvers may be varied, or the louvers may be entirely replaced by other spacing means.

Figure 6:
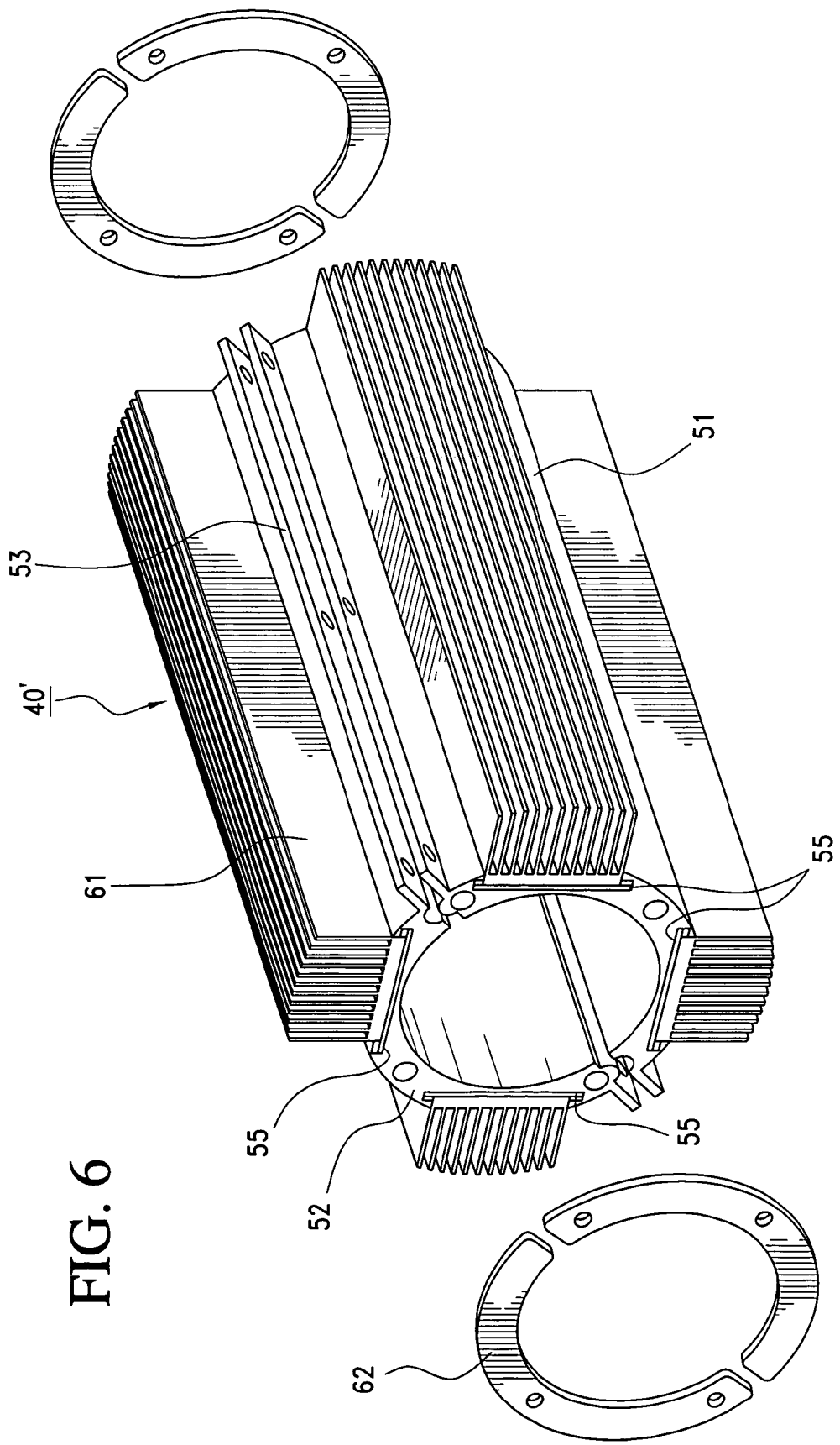
FIG. 6 is an isometric view of an alternative embodiment of a heat exchanger for use in connection with the preferred converter.

FIG. 6 shows an alternative to the modular water-cooled heat exchanger of FIGS. 2 and 3. In this embodiment, cooling is achieved by heat radiating fins 61 rather than cooling pipe mounts as in the embodiment illustrated in FIGS. 2 and 3. The remaining elements of the heat exchanger 40' of this embodiment are the same as those shown in FIGS. 2 and 3, although the core of converter 3 is not shown. Of course, the heat exchanger 40' is provided with any necessary insulators, such as gaskets 62, as well as appropriate fasteners (not shown) and the like.

Referring back to FIG. 1, in an especially preferred embodiment of the invention, sensors 43 such as oxygen sensor 32 and temperature sensor 43 may be provided to assess converter performance and adjust the temperature differential to ensure that the temperature of the converter remains optimum. The temperature differential may be adjusted, for example, by adjusting the flow of coolant through the pipe 42. If the temperature is too hot, the life of the catalyst will be reduced, and therefore the catalyst should remain at about the lightoff temperature.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention. For example, in an alternative embodiment of the invention, instead of generating the hydrogen within the vehicle, the hydrogen injected into the exhaust stream and, optionally, the intake manifold, may be externally generated and pumped into a small storage tank (not shown) from outside the vehicle, or supplied in brick form. In that case, the thermoelectric generators may be omitted, or energy from waste heat may be used for other purposes, including those described in the above-cited U.S. Pat. Nos. 6,605,773; 6,172,427; 5,625,245; 4,753,682; and 4,673,863.

On the other hand, it will be appreciated that the principle of using of waste heat to generate hydrogen for vehicle propulsion in a hydrogen, hydrogen fuel cell, hydrogen/internal combustion, hydrogen/electric, or hydrogen/internal combustion/electric powered vehicle may be applied even in the absence of catalytic converter pre-heating by hydrogen injection. Accordingly, it is intended that the invention not be limited by the above description or accompanying drawings, but that it be defined solely in accordance with the appended claims.

I claim:

1. A catalytic converter assembly designed to enhance thermoelectric generation, including providing a catalyst coated heat sink arranged to conduct heat to an outside surface of a converter core, a cooling structure arranged to enhance the thermal differential required for thermoelectric generation, and a thermo-electric generator structure in thermal contact with the heat sink and the cooling structure, wherein the heat sink includes a heat-conductive sheet rolled into a spiral and sealed at an outside surface to form a sealed structure, the heat sink being coated with a catalyst layer.

2. A catalytic converter assembly as claimed in claim 1, wherein both principal surfaces of the heat-conductive sheet are coated with said catalyst layer.

3. A catalytic converter assembly as claimed in claim 1, wherein said cooling structure and thermo-electric generator are included in a modular structure that clamps onto said core.

4. A catalytic converter assembly as claimed in claim 3, wherein said modular structure includes exchanger halves arranged to be clamped onto said converter core, said halves having grooves in which are positioned insulating structures containing thermo-electric generator elements, said thermo-electric generator elements being in thermal contact with both said heat sink and said cooling structure.

5. A catalytic converter assembly as claimed in claim 4, wherein said cooling structure includes grooves into which coolant-carrying pipes may be snap-fit.

6. A catalytic converter assembly as claimed in claim 4, wherein said cooling structure includes fins.

7. A catalytic converter as claimed in claim 1, further comprising temperature control means for controlling a fluid supplied to said cooling structure to control said temperature differential.

8. A catalytic converter as claimed in claim 7, wherein said temperature control means is connected to sensors for measuring operating parameters of said catalytic converter.

9. A thermo-electric generator heat exchanger structure for clamping onto a source of heat in an exhaust system of a vehicle and thereby converting the source of heat into a source of electricity, comprising two exchanger halves clamped onto said heat source, said halves including a heat conductive structure arranged to be in thermal contact with the heat source when the exchanger halves are clamped onto the heat source and a cooling structure insulated from the heat conductive structure, the heat conductive structure having grooves in which are positioned containing thermo-electric generator elements, said thermo-electric generator elements being in thermal contact with both said heat sink and said cooling structure.

10. A thermo-electric generator heat exchanger structure as claimed in claim 9, wherein said cooling structure includes grooves into which coolant-carrying pipes may be snap-fit.

11. A thermo-electric generator heat exchanger structure as claimed in claim 9, wherein said cooling structure includes fins.

12. A catalytic converter as claimed in claim 9, wherein said cooling structure comprises means for carrying a cooling fluid.

* * * * *